UNITED STATES PATENT OFFICE.

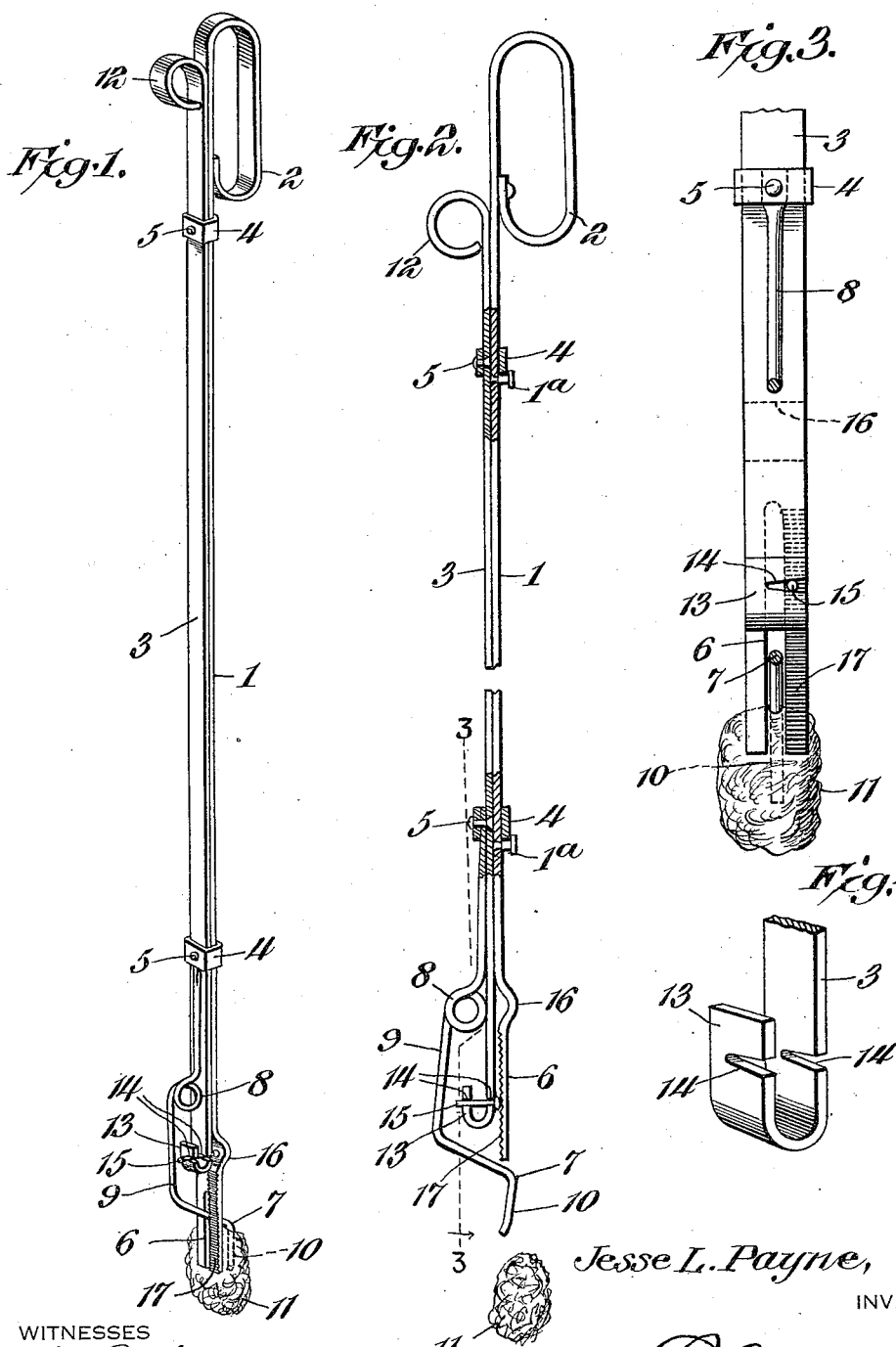

JESSE LEE PAYNE, OF SALINAS, CALIFORNIA.

EXTERMINATOR.

1,052,376.　　　　　　Specification of Letters Patent.　　　Patented Feb. 4, 1913.

Application filed April 30, 1912.　Serial No. 694,177.

*To all whom it may concern:*

Be it known that I, JESSE L. PAYNE, a citizen of the United States, residing at Salinas, in the county of Monterey and State of California, have invented a new and useful Exterminator, of which the following is a specification.

This invention relates to improvements in devices for the extermination of such pests as gophers, rats, squirrels and other rodents. Great damage is often wrought to orchards, vineyards, grain fields and growing crops by the attacks of such animals, and countless efforts have been made to exterminate them.

The object of my invention is to provide a simple and cheaply constructed hand operated device, which will enable the user to readily apply the same to the run or burrow of such an animal, and to place therein fume-generating means, such as cotton or rags saturated with carbon bisulfid, or other combustible liquid and to ignite the same, whereby the animal will be overcome by such fumes after the device has been withdrawn and the entrance to the said run or burrow closed.

With these and other objects in view, the invention consists in the construction and novel combination of parts hereinafter fully described, illustrated in the drawing forming a part of this specification, and specifically pointed out in the claims; it being understood that various changes in the form, proportion, size and minor details of construction may be resorted to, within the scope of the appended claims, without departing from the spirit or sacrificing any of the advantages of the invention.

In the drawing in which like reference numerals designate corresponding parts in all the figures: Figure 1 is a perspective view of the invention supplied with an inflammable wad of cotton ready for insertion into the burrow or run. Fig. 2 is an edge elevation, somewhat enlarged and partly in ction, showing the device in a position for ejecting the wad. Fig. 3 is a detail section taken on the line 3—3 of Fig. 2. Fig. 4 is an enlarged detailed perspective view of the lower end of the manipulating member, showing the match holding means thereof.

The device consists in a main bar or body member 1, which is composed of thin flexible metal, adapted to readily bend to accommodate itself to the irregularities of the burrow of an animal, such as a gopher or squirrel. This body member for convenience has formed on its upper or inner extremity a loop-shaped handle 2, adapted to be readily grasped to aid its introduction into the burrow. Any other form of handle may be used. Arranged in overlapping sliding engagement with the main bar 1 is another thin flexible metallic bar or member 3, held in position to the main bar or member by spaced loops 4, forming guides for the member 1, and these guides are preferably fastened by rivets 5 to the said metallic bar 3.

The lower end of the main bar 1 is slotted or bifurcated as shown at 6 to form a fork, through the slot of which extends a spring clamping member 7 in the form of a stout spring wire, which is held at one end by the rivet 5 of the lowermost loop and following the outer side of the actuating bar 3, to a spring coil 8 formed intermediate its length, then formed with an offset straight portion 9 to a point opposite the bifurcation 6 and then through the latter to the clamping member 7. The clamping member has a down-turned terminal finger 10, which co-acts with the lower bifurcated end of the fork 6 of the main body member 1 to hold a wad of rags or cotton, designated by the reference numeral 11. This wad may be of any other suitable absorbent inflammable material and, prior to its introduction into the burrow, is saturated with some volatile substance, such as carbon bisulfid or other like combustible material, which, upon being ignited by means to be hereinafter described, will give off noxious fumes resulting in the death by suffocation or asphyxiation of the animal.

It will be seen that in the normal position of the device shown in Fig. 1, with the operating bar 3 drawn back so that the finger loop 12 is close to the main handle 2 of the body member 1, that means are provided for securely holding the inflammable wad so that it may be introduced into the burrow of a gopher or squirrel and afterward by a downward or outward movement of the sliding bar 3 through the handle 12, the spring clamping member 7 is forced to eject the wad from the bifurcated end of the main body member 1. In order to prevent too great a movement of the sliding member 3, stops in the form of rivets having projecting heads 1ª are formed on the main body member 1, and these lugs are adapted to contact with the guide loops 4 in the movement of the member 3, and thereby arrest such movement. Prior to the completion of this ejecting movement, the wad is caused to be ignited by simple means, which consists in bending the lower or outer end of the operating member 3 backwardly or upwardly, as illustrated at 13, and then providing horizontally extending tapered slots 14 in the upturned portion 13 and the adjacent body portion to receive a common match 15, the head of which normally lies in a laterally extending bend 16 formed in the main member 1.

One tine or branch of the bifurcated or forked end of the main body member 1 is serrated or roughened, as shown at 17, and these serrations lie in the path of movement of the match head, and cause the same to be ignited upon the downward or outward sliding movement of the operating member 3.

In the operation of the device it will be readily seen that it is only necessary to provide a wad of some absorbent material, such as cotton, rags, or waste, and to saturate the same with an inflammable fluid that will, upon ignition, give off noxious fumes to cause suffocation or asphyxiation of the animal to be exterminated. By inward pressure upon the portion 9 of the spring clamping member 7, such wad 11 of saturated material may be easily introduced between the down-turned finger 10 and the lower end of the main body member 1. After inserting the match in the transversely disposed tapered slots 14, the device is ready to be introduced into the entrance to the run or burrow of a gopher or other animal. By a downward or outward pressure upon the operating handle 12 with relation to the member 1, the portion of the clamp 7 traversing the slotted or bifurcated end 6 of the body member starts to force the wad of saturated cotton or other material downwardly or outwardly and free of engagement with the clamping members. At the same time the head of the match is carried from the recess formed by the laterally extending bend 16 and encounters the serrations 17 and is lighted. The flame ignites the combustible wad and at the next instant, through the continued downward or outward movement of the operating bar 3, the ignited mass is ejected. The device is then withdrawn from the burrow, and the latter is immediately closed with earth or otherwise, when the heat, smoke and noxious fumes generated will overcome the gopher or animal and cause its extermination.

What is claimed is:—

1. A device of the class described comprising two bars or members slidable one upon the other, co-acting clamp devices on the lower or outer ends of said members for holding inflammable material, means for holding an igniter, and means for causing the lighting of the said igniter to ignite the inflammable material.

2. A device of the class described comprising two supporting members one slidable on the other and each carrying a clamp member in operative relation to the other clamp member, one clamp member being movable by its support along and beyond the other clamp member and formed to engage and project material carried by the clamp when said clamp member is moved to the position beyond the other clamp member.

3. A device of the class described comprising two flexible bars provided with means for holding an inflammable wad, whereby it may be inserted in a burrow or other hole, one of the bars being movable along the other and provided with means for holding a match, and the other bar having serrations thereon to contact with the head of such match to produce a flame during the movement of the match carrying bar.

4. In a device of the class described, a body member having a bifurcated end, one side of which is serrated or roughened, another bar slidable thereon and carrying match holding means in operative relation to the serrated portion, and a resilient member adapted to project through the bifurcated portion with the projecting end adapted to co-act with the bifurcated portion to constitute a clamp, said resilient member having a range of movement into and out of the space defined by the bifurcated portion for ejecting a wad held by said resilient member.

5. In a device of the class described, the combination with the thin spring metal bars placed flat against each other and having operating handles at one end, guiding loops carried by one bar and embracing the other bar, means for limiting the sliding movement of the bars upon each other, a match holding device carried by one bar, serrations provided on the other bar in the path of movement of the match holding device, and a clamping device carried by the same bar as the match holding device and arranged to hold an inflammable wad in advance of the match holding device.

6. In a device of the class described, the combination with flexible relatively slidable bars, clamping means for holding a wad of combustible material, holding means for a match, and operating means whereby the sliding movement of the bars causes the lighting of the match, the ignition of the wad and the release of the latter.

7. In a device of the class described, the combination with relatively movable operating members, means for holding a match, a clamp for retaining a wad of combustible material in advance of the match, and means whereby the movement of the said members causes the lighting of the match, the ignition of the wad and the release of the latter, in the order named.

8. In a device of the class described, relatively movable operating members, one member being provided with means for holding a match, and the other member being provided with means against which the head of the match may be struck, and a spring clamp on the match holding member in operative relation to the match striking means and related thereto to confine a wad of combustible material contiguous to that portion of the match striking means where the match is ignited.

9. The combination with relatively movable operating members, means for holding a match mounted on one of the members, means for striking said match mounted on the other member, and a clamp member for holding a wad of combustible material contiguous to the match striking means, said clamp being mounted on the same member carrying the means for holding the match, said other member being provided with clamping means in coactive relation to the first-named clamping member.

10. In a device of the class described, two clamp members for holding a wad of material adapted to receive combustible liquid, one clamp member being movable lengthwise of and beyond the other clamp member and provided with a portion shaped to engage the clamped wad and eject it from its clamped position.

11. In a device of the class described, two clamp members one of which has a normal tendency toward the other to clamp a wad of material between them, said clamp member being movable lengthwise of and beyond the other and provided with means to engage the clamped wad and eject it from between said members.

12. In a device of the class described, two clamp members, one of which is bifurcated and the other of which comprises a spring member extending through the bifurcated member and movable along and beyond the end of the bifurcated portion thereof, the spring member having a constant tendency to clamp a wad of material against the bifurcated member and shaped to engage the wad to eject it when the spring member is moved beyond the end of the bifurcated member.

In testimony, that I claim the foregoing as my own, I have hereto affixed my signature in the presence of two witnesses.

JESSE LEE PAYNE.

Witnesses:
J. A. BARDIN,
LENA JENSEN.

---

Copies of this patent may be obtained for five cents each, by addressing the "Commissioner of Patents, Washington, D. C."